Figure 1:
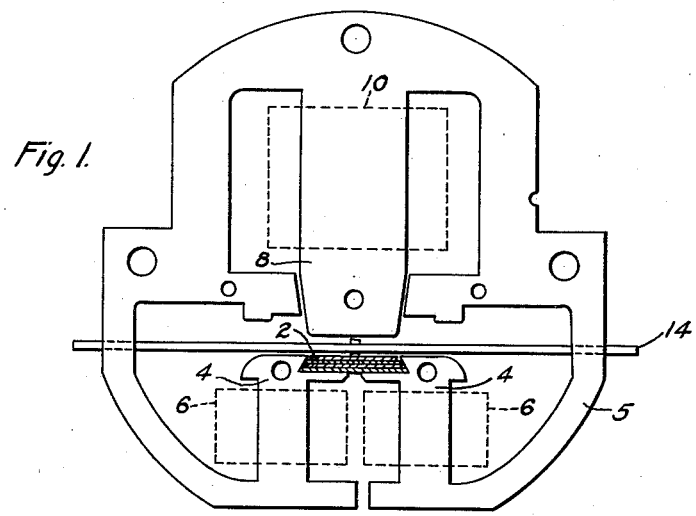

Aug. 8, 1939.  R. M. LEIPPE  2,169,028

WATT-HOUR METER

Filed July 10, 1937

WITNESSES:
Leon M. Garman
Nm. C. Groome

INVENTOR
Richard M. Leippe.
BY
ATTORNEY

Patented Aug. 8, 1939

2,169,028

UNITED STATES PATENT OFFICE 2,169,028

WATT-HOUR METER

Richard M. Leippe, East Orange, N. J., assignor to Westinghouse Electric & Manufacturing Company, East Pittsburgh, Pa., a corporation of Pennsylvania Application July 10, 1937, Serial No. 152,924

8 Claims. (Cl. 171—264)

The present invention relates to an improved electromagnet structure for instruments of the induction disc type, and more specifically to means for compensating the instrument for errors occurring under overload conditions.

The following description will be given with specific reference to a watthour meter electromagnet but quite obviously the invention will be useful in many other relations.

In the induction type of watthour meter, a current flux and a potential flux are imposed upon a disc armature to set up a shifting or rotating field in the armature, causing it to rotate. Within the normal rating of the meter the rotation of the armature is substantially proportional to the energy of the circuit with which the meter is associated. However, under existing conditions quite frequently the full load rating of the meter is greatly exceeded; 300% and 400% of rated load being quite common. As the current traversing the series coil of the meter increases, the current flux has a damping effect on the rotation of the disc and this, of course, increases as the current increases, causing the registration curve of the meter to fall off quite rapidly in the higher load ranges.

The decrease in armature speed, due to self-damping, or damping by the excessive current flux, has been compensated in the past to some extent by means of a saturable shunt across the series pole portions of the meter, so that when the energization of the series winding attains a predetermined magnitude the shunt will saturate, or become of marked decrease in permeability, to cause a smaller portion of the total flux to traverse the shunt. Accordingly, a greater value of flux acting on the disc armature is made available, resulting in an increase in speed of the armature to overcome the decrease in speed resulting from self-damping action.

However, the decrease in permeability of the shunt is more or less abrupt and affords compensation for only a relatively narrow range of overload. As a result the registration curve of the meter with increase in load beyond the rating of the meter tends to gradually fall off until the value required to markedly decrease the permeability of the shunt is reached. The curve then abruptly rises and with additional increase in load, the curve again begins to fall off. This means that the amount of overload compensation effected is limited by the single rise in registration where the shunt action is quite definite.

It is an object of the present invention to provide overload compensation for an electromagnet of a watthour meter, or similar electrical instrumentality, which will be effective over a relatively wide range of overload as compared to compensating devices heretofore used, and to provide compensation generally whenever it is desired to obtain a rise in any portion of the registration curve of the meter, as at less than rated load.

Figure 2:
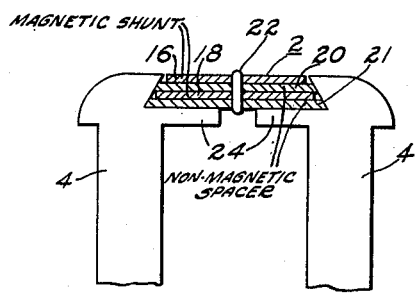
Figure 3:
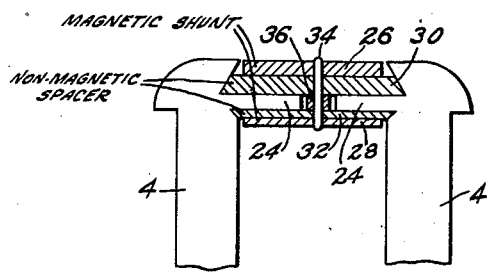
Figure 4:
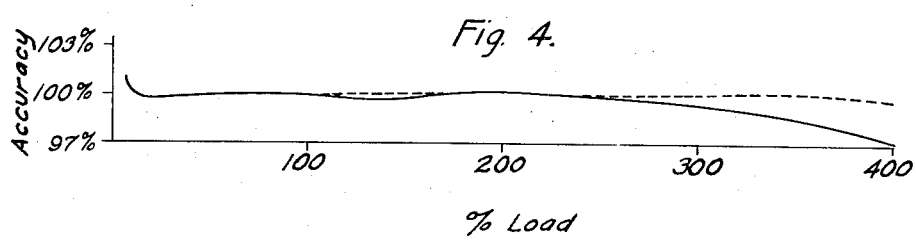

Other objects of the invention will be apparent from the following description and from the accompanying drawing, in which:

Figure 1 is a view in elevation of a watthour meter electromagnet, certain portions of which are shown in dotted lines and portions of which are in section, embodying the present invention, Fig. 2 is an enlarged view of a portion of the structure shown in Fig. 1, Fig. 3 is an enlarged view of a modification of the structure shown in Fig. 2; and, Fig. 4 is a curve illustrating the operation of the present invention.

It will be apparent that the invention to be described is applicable generally to improve or raise the registration curve of a meter or similar device at any desired portion or portions thereof, but it will be described specifically as a compensation for that portion of the curve above the full load rating of a watthour meter.

Referring first to Fig. 4, the usual registration curve of a watthour meter; that is, the curve indicating the accuracy of the meter over a range of load, is shown as a solid line. The more or less abrupt action of the shunt is quite evident as seen by the rise in the curve from 150% to 200% load, and thereafter the curve gradually falls off until when 400% load is reached the accuracy of the meter is off approximately 3%. In accordance with the present invention, however, it has been found that the drooping characteristic of the usual registration curve may be compensated in an effective manner, as indicated by the dotted curve. It will be noted that at slightly above 200% load, the compensation becomes effective but the curve starts to droop slightly at about 300% when further compensation is made which is effective up to at least 400% load.

The compensation, as indicated by the dotted line curve in Fig. 4, is obtained by a magnetic shunt 2 (Fig. 1) bridging the series pole portions 4 of a laminated electromagnet 5. The series poles 4 are provided with windings 6, shown in dotted lines, which in the case of a watthour meter are traversed in series by the load current. The electromagnet 5 is also provided with a pole portion 8 for receiving a voltage coil 10, shown in dotted lines. Between the confronting areas of the pole portions 4 and 8 a disc armature 14 is rotatably mounted to be acted upon by the series and potential fluxes emanating from the poles 4 and 8, to cause rotation in a well known manner.

The specific design of the electromagnet lamination, the windings 6 and 10 and the disc armature are more or less conventional and further description thereof is not considered necessary.

Referring to Fig. 2, which shows the shunt 2 on an enlarged scale, it will be noted that the shunt is formed of several elements which may, for purposes of example, comprise two strips 16 and 18 of magnetic material which are spaced from each other, and from the pole portions 4, by strips or spacers 20 and 21 of non-magnetic material. Accordingly, the magnetic strips 16 and 18 are magnetically insulated from each other and from the pole tips. The spacers 20 and 21 may be of any desired non-magnetic material, such as brass, copper, fiber, etc., and may be assembled with the magnetic strips by means of a pin 22 of non-magnetic material. Of course other methods of assembly may be used, such as soldering, welding or clamping the strips together.

Each of the pole tips 4 has the inner upper portion thereof cut away to form a notch and is provided with lateral extensions 24 extending toward each other to form with the notched portions a recess for holding the shunt.

It is contemplated that the magnetic strips 16 and 18 will be of different dimensions (length, thickness or breadth) so that they will be of different magnetic reluctance even though they are of the same magnetic material. However, they may be of the same dimensions but of magnetic materials having different magnetic qualities, or they may be of the same dimensions and same magnetic qualities but so positioned in the magnetic circuit that one strip will be subjected to a greater magnetomotive force than the other. Or combinations of these possibilities may be resorted to.

In operation during the normal load range of the meter, a predetermined amount of the flux generated in the pole portions 4 by the windings 6 will traverse the shunt and not be effective to drive the disc armature.

However, as the load increases, thereby increasing the total flux induced by the windings 6, a larger amount of flux traverses the shunt until a point is reached where one or the other of the magnetic strips 16 and 18, depending upon its dimensions, magnetic properties or position, will approach saturation, and therefore decrease in permeability. Accordingly, a greater proportion of the total flux from the windings 6 will now traverse the disc armature, causing it to rotate at a higher rate to compensate for the self-damping caused by the rise in current flux.

As the load continues to rise, the other of the portions 16 or 18 approaches saturation, decreasing its permeability to further limit the flux traversing the shunt. As a result, a further increment of effective flux is available for increasing the speed of the armature.

Although in Fig. 2 only two strips of magnetic material have been shown, it is within the scope of the invention to include as many as may be desired to obtain a smooth compensation throughout the expected load range of the meter.

In the modification shown in Fig. 3, the strips of magnetic material 26 and 28 are disposed on opposite sides of the lateral projections 24 of the pole tips and are spaced therefrom by non-magnetic strips 30 and 32. The various strips are maintained in assembled relation by means of a non-magnetic pin 34 and a suitable bushing 36 clamping them on opposite sides of the lateral pole extensions 24. Of course, other means of retaining them in assembled relation may be used as above mentioned. This modification illustrates one way of mounting the strips 26 and 28 so that different values of magneto-motive force will be impressed upon them so that one may approach saturation sooner than the other even though they are of the same dimensions and of the same material.

The composite shunt or multiple shunt system described is quite simple and rugged, involves no moving parts and may be readily applied to desirably compensate an induction type meter for errors occurring under overload conditions. Quite obviously, the construction shown can be varied to meet the requirements of meters of various types and to obtain as smooth or extended an overload compensation as may be desired.

Also it should be apparent that the invention is not limited to overload compensation but is applicable to compensate or change the shape of the registration curve at any point where it appears necessary or desirable to do so. That is, in addition to, or without regard to, the compensation shown and described, it may be expedient to provide a compensating strip or strips to obtain a rise in the curve below the full load rating of the meter.

As noted previously, many uses of the invention, aside from watthour meters specifically, should be apparent, and it is expected that the invention be limited only by the prior art and the scope of the appended claims.

I claim as my invention:

1. In an electromagnet including a pair of pole portions terminating adjacent to an armature and means for inducing a magnetic flux therein, means for shunting a portion of the induced flux from its normal path through the armature, comprising a composite shunt including a plurality of superposed elements of magnetic material magnetically insulated from each other and from said pole portions and being such that each approaches magnetic saturation at a different value of magnetic flux.

2. In an electromagnet including a pair of parallel pole portions terminating adjacent to an armature and means for inducing a magnetic flux therein, means for shunting a portion of the induced flux from its normal path through the armature in pole faces extending substantially over the thickness of the electromagnet, comprising a composite shunt including a plurality of elements of magnetic material magnetically insulated from each other and from said pole portions and being of such magnetic qualities that as the flux in the pole portions increases the elements become progressively effective to cause the shunted flux to progressively decrease in proportion to the increase in the total induced flux.

3. In an electromagnet for an instrument of the induction type including a pair of laminated pole portions extending toward a rotatable disc armature, substantially all of the laminations of said laminated poles being similar in design, and windings for inducing a flux in said pole portions, means for progressively and disproportionally increasing the amount of flux traversing said armature from said pole portions as the energization of said windings increases, comprising a shunt bridging the ends of the pole portions including magnetic elements proportioned to approach magnetic saturation at different flux values to progressively decrease the proportional amount of flux traversing the shunt.

4. In an electromagnet for an instrument of the induction type including a pair of laminated pole portions extending toward a rotatable disc armature, substantially all of the laminations of said laminated poles being similar in design, and windings for inducing a flux in said pole portions, means for progressively and disproportionally increasing the amount of flux traversing said armature from said pole portions as the energization of said windings increases, comprising a shunt bridging the ends of the pole portions including superposed magnetic elements proportioned to approach magnetic saturation at different flux values to progressively decrease the proportional amount of flux traversing the shunt, non-magnetic material for spacing said elements from each other, and means for securing the elements and material in operative position.

5. In an electromagnet for an instrument of the induction type including a pair of laminated pole portions extending toward a rotatable disc armature and windings for inducing a flux in said pole portions, means for progressively increasing the amount of flux traversing said armature from said pole portions as the energization of said windings increases, comprising a shunt bridging the ends of the pole portions including magnetic elements proportioned to approach magnetic saturation at different flux values to progressively decrease the proportionate amount of flux traversing the shunt, non-magnetic material for spacing said elements from each other, and means for securing the elements and material in operative position including lateral projections on said pole portions tending to bridge the gap between them.

6. In an electromagnet for an electrical instrument, a magnetic core having a plurality of pole faces for producing a main magnetic field, each of said pole faces having an area substantially equal to at least the cross-section of said magnetic core, energizing means for creating a variable magnetic flux in said core, and shunt means for deviating a portion of said magnetic flux away from said main magnetic field, said shunt means comprising a plurality of magnetic members, and supporting means for supporting one of said magnetic members substantially out of contact with said magnetic core and the remainder of said magnetic members, said magnetic members being designed to saturate at different values of said magnetic flux.

7. In an electromagnet including a pair of spaced pole portions terminating adjacent to an armature and means for inducing a magnetic flux therein, means for shunting a portion of the induced flux from its normal path through the armature, comprising a plural element magnetic shunt positioned substantially entirely in the space available between said pole portions, the elements of said shunt being such that they successively become less permeable as the flux induced in the pole portions increases.

8. In an electromagnet including a pair of spaced pole portions terminating adjacent to an armature and means for inducing a magnetic flux therein, means for shunting a portion of the induced flux from its normal path through the armature, comprising a plural element magnetic shunt extending between said pole portions, one element of said shunt having its ends extending over predetermined surfaces provided on said pole portions and a second element of said shunt having its ends extending over said predetermined surfaces, the elements of said shunt being magnetically insulated from each other and so proportioned that they successively become less permeable as the flux in the pole portions increases.

RICHARD M. LEIPPE.